United States Patent
Pal Singh et al.

(10) Patent No.: US 12,336,022 B2
(45) Date of Patent: Jun. 17, 2025

(54) SYSTEMS AND METHODS FOR OPTIMIZING WIRELESS NETWORK ACCESSES WITH PEER-TO-PEER NETWORKS

(71) Applicant: Samsung Electronics Company, Ltd., Suwon-si (KR)

(72) Inventors: Davinder Pal Singh, Coquitlam (CA); Surhud Khare, Burnaby (CA)

(73) Assignee: Samsung Electronics Company, Ltd., Suwon (KR)

(*) Notice: Subject to any disclaimer, the term of this patent is extended or adjusted under 35 U.S.C. 154(b) by 426 days.

(21) Appl. No.: 18/153,917

(22) Filed: Jan. 12, 2023

(65) Prior Publication Data

US 2024/0244676 A1    Jul. 18, 2024

(51) Int. Cl.
| | | |
|---|---|---|
| *H04W 76/10* | (2018.01) | |
| *H04W 28/02* | (2009.01) | |
| *H04W 84/18* | (2009.01) | |

(52) U.S. Cl.
CPC ....... *H04W 76/10* (2018.02); *H04W 28/0231* (2013.01); *H04W 84/18* (2013.01)

(58) Field of Classification Search
CPC . H04W 76/10; H04W 28/0231; H04W 84/18; H04W 48/20
See application file for complete search history.

(56) References Cited

U.S. PATENT DOCUMENTS

| | | | |
|---|---|---|---|
| 9,241,304 B2 | 1/2016 | Dawson | |
| 9,924,559 B2 | 3/2018 | Visuri | |
| 10,104,665 B2 | 10/2018 | Ngo | |
| 10,356,684 B2 | 7/2019 | Karimi-Cherkandi | |
| 2016/0127950 A1 | 5/2016 | Gupta | |
| 2016/0192147 A1 | 6/2016 | Marri | |
| 2017/0105222 A1 | 4/2017 | Nieman | |
| 2017/0245312 A1* | 8/2017 | Kalhan | H04W 76/10 |
| 2019/0053041 A1 | 2/2019 | Bergström | |

(Continued)

FOREIGN PATENT DOCUMENTS

KR    20140100171 A    8/2014

OTHER PUBLICATIONS

International Search Report and Written Opinion for International Application No. PCT/KR2023/004129 mailed on Oct. 11, 2023, 6 pages.

(Continued)

*Primary Examiner* — Kan Yuen
(74) *Attorney, Agent, or Firm* — Baker Botts L.L.P.

(57) ABSTRACT

In one embodiment, a method by a first edge device includes joining a wireless peer-to-peer network, where the first edge device is not connected to an access point of a wireless infrastructure network, where the wireless infrastructure network comprises a number of access points, collecting network data associated with the first edge device, receiving network data associated with one or more second edge devices from the one or more second edge devices through the wireless peer-to-peer network, selecting a first access point among the number of access points to connect based on the network data collected by the first edge device and the network data received from the one or more second edge devices, and sending a connection establishment request to the first access point.

20 Claims, 7 Drawing Sheets

(56) References Cited

U.S. PATENT DOCUMENTS

2020/0314897 A1* 10/2020 Bendigeri ............ H04W 48/16
2021/0176613 A1   6/2021 Purkayastha
2024/0340737 A1* 10/2024 Chen ................ H04W 36/0061

OTHER PUBLICATIONS

Saeik et al., 'Task Offloading in Edge and Cloud Computing: A Survey on Mathematical, Artificial Intelligence and Control Theory Solutions', Computer Networks, vol. 195, downloaded on Sep. 15, 2023, accepted on May 14, 2021, 41 pages. https://doi.org/10.1016/j.comnet.2021.108177.
Dimatteo et al., 'Cellular Traffic Offloading through WiFi Networks', 2011 IEEE Eighth International Conference on Mobile Ad-Hoc and Sensor Systems, Oct. 22, 2011, pp. 192-201.
Jonas Hochst et al.; Learning Wi-Fi Connection Loss Predictions for Seamless Vertical Handovers Using Multipath TCP; arXiv:1907.10493v1 [cs.NI]. https://arxiv.org/pdf/1907.10493.pdf, Jul. 24, 2019.
Pprasanna Murali Krishna et al.; A QoS improvement in P2P based Wireless Mesh Network using Hybrid Swarm Intelligence; Indian Journal of Science and Technology, vol. 9(36), DOI: 10.17485/ijst/2016/v9136/102602; https://sciresol.s3.us-east-2.amazonaws.com/IJST/Articles/2016/Issue-36/Article 129.pdf, Sep. 2016.
Fernandez Duran, A., Perez Leal, R. & Alonso, J.I. A Method to Estimate the Horizontal Handover Decision Effect on Indoor Wireless Conversational Video Quality. EURASIP J. Adv. Signal Process. 2008, 370524 (2008). https://doi.org/10.1155/2008/370524, Apr. 13, 2008.
Muhammad Asif Khan et al.; ML-based Handover Prediction and AP Selection in Cognitive Wi-Fi Networks; arXiv:2111.13879v2 [cs.NI]; arXiv:2111.13879, May 29, 2022.

* cited by examiner

| Device ID | Cur AP | RSSIs | Network Usage | App Usages |
|---|---|---|---|---|
| 207 | N/A | A:$x_7$, B:$y_7$ | 0 kbps | 0, 0, 0 |
| 201 | A | A:$x_1$, B:$y_1$ | 150 kbps | $\alpha_1, \beta_1, \gamma_1$ |
| 202 | A | A:$x_2$, B:$y_2$ | 180 kbps | $\alpha_2, \beta_2, \gamma_2$ |
| 203 | A | A:$x_3$, B:$y_3$ | 120 kbps | $\alpha_3, \beta_3, \gamma_3$ |
| ... | | | | |
| 208 | B | A:$x_8$, B:$y_8$ | 1240 kbps | $\alpha_8, \beta_8, \gamma_8$ |
| 209 | B | A:$x_9$, B:$y_9$ | 125 kbps | $\alpha_9, \beta_9, \gamma_9$ |

410: Network Data at Device 207

*FIG. 4*

510: Network Data at Device 207

| Device ID | Cur AP | RSSIs | Network Usage | App Usages |
|---|---|---|---|---|
| 207 | B | A:$x'_7$, B:$y'_7$ | 350 kbps | $\alpha'_7, \beta'_7, \gamma'_7$ |
| 201 | B | A:$x'_1$, B:$y'_1$ | 250 kbps | $\alpha'_1, \beta'_1, \gamma'_1$ |
| 202 | B | A:$x'_2$, B:$y'_2$ | 135 kbps | $\alpha'_2, \beta'_2, \gamma'_2$ |
| 203 | A | A:$x'_3$, B:$y'_3$ | 1520 kbps | $\alpha'_3, \beta'_3, \gamma'_3$ |
| ... | | | | |
| 208 | B | A:$x'_8$, B:$y'_8$ | 1240 kbps | $\alpha'_8, \beta'_8, \gamma'_8$ |
| 209 | B | A:$x'_9$, B:$y'_9$ | 625 kbps | $\alpha'_9, \beta'_9, \gamma'_9$ |

SYSTEMS AND METHODS FOR OPTIMIZING WIRELESS NETWORK ACCESSES WITH PEER-TO-PEER NETWORKS

TECHNICAL FIELD

This disclosure relates generally to database and file management within network environments, and in particular relates to wireless network access managements.

BACKGROUND

Mobile devices such as smart phones and tablet computers have contributed to rapid growth in data communications. Mobile traffic through wireless infrastructure network accounts for a large percentage of whole data traffic. Many mobile devices have advanced multimedia capabilities and resource intensive applications such as video streaming, video conferencing and video chatting that use high resolution video. Wireless local area networking (WLAN), which may be referred to as Wi-Fi or WiFi and may be based on IEEE 802.11 standards, may be utilized to deliver multimedia data and other types of traffic to mobile and fixed devices. Wireless infrastructure networks including WLANs and cellular networks provide wireless connectivity to the mobile devices through access points or based stations. When an access point is connected by a large number of mobile devices, a congestion may occur where the connected mobile devices experience low data rates. Congestions may also occur when many of the connected mobile devices are using applications that require large network bandwidth.

SUMMARY OF PARTICULAR EMBODIMENTS

In particular embodiments, an edge device may determine an access point to connect among a plurality of access points of a wireless infrastructure network based on network data associated with the edge device and network data associated with other edge devices received through a wireless peer-to-peer network. The number of devices using WLAN has been increasing drastically over the last several years with around 22.2 billion WLAN connected devices in 2021. WLAN access point is a popular method of connecting a device with the internet. Access point (also referred as AP) is a networking hardware device that helps in connecting wireless capable edge devices with wired networks through a wireless standard, such as Institute of Electrical and Electronics Engineers (IEEE) 802.11 family. Network congestion may be caused in a scenario when a number of devices connected to an access point is greater than a number that the access point can handle or when an amount of total traffic exceeds a capacity of the access point. The network congestion results in packet losses and reduced quality. The network congestion may happen in places such as a Grocery store where people at the billing/checkout is concentrated whereas few people exist in the other areas such as aisles. The network congestion may lead to drops in connections, which results in poor Quality of Experience (QoE). Offices and warehouses are among other places where a similar issue can occur.

At times, some client devices may be connected to an access point with a significantly low Received Signal Strength Indicator (RSSI). In certain cases, the client devices may not be able to communicate with the connected access point at all due to poor signal quality. Those client devices may cause performance degradation for other devices. The access points may use some strategies to mitigate such issues, such as encouraging devices to connect to the best available access point, discouraging devices to connect to low data rates, or de-authenticating devices that cannot be served. The edge devices may need a smart solution that can be implemented on the edge devices. The edge devices with such solution may enable the strategies in efficient manners.

Previous approaches to resolve the situations already exist including predicting the access point selection based on device characteristics such as device location and direction of movement. This approach may experience low accuracy in an indoor environment due to inaccurate indoor Global Positioning System (GPS). Another disadvantage associated with the previous approaches may be that the approaches may lead to a problem of local optima because each device is making a decision based on its own characteristics. With the methods disclosed herein, an edge device may consider network usage of other devices as well. Thus, the solution may lead to a globally optimum solution. No previous attempt exists to use a peer-to-peer network to collectively optimize the network usage by selecting the best access point. This approach may optimize the quality of experience by switching an edge device to another access point automatically when the edge device is experiencing a congestion with the current access point or the edge device is closer to the another access point. Switching of the edge device may lead to better QoE for the other edge devices in the network. The switch-over decision may be made based on data distributed through a peer-to-peer network of edge devices. Each edge device participating in the peer-to-peer network may run an optimization algorithm to determine whether the edge device needs to switch the access point. By avoiding the use of a central server, the approach may be able to avoid a single point of failure.

In particular embodiments, a wireless infrastructure network may comprise a plurality of access points. A first edge device may select one of the plurality of access points to connect based on RSSIs for signals received from one or more of the plurality of access points. The first edge device may send a connection establishment request to the selected access point. The first edge device may determine that the request was unsuccessful either upon an expiration of a response waiting timer or upon receiving a message indicating a rejection to the request from the one of the plurality of access points. The first edge device may join a wireless peer-to-peer network while the first edge device is not connected to an access point of the wireless infrastructure network. In particular embodiments, the wireless peer-to-peer network may use Gossip protocol as a communication protocol. The wireless peer-to-peer network may use Bluetooth or Wi-Fi Direct for a communication medium. The first edge device may collect network data associated with the first edge device. The network data associated with an edge device may comprise data associated with a wireless network interface of the edge device and data associated with one or more applications running on the edge device. The data associated with the wireless network interface of the edge device may comprise an identification information for an access point that the edge device is currently connected to, RSSIs for signals received from one or more of the plurality of access points, or real-time network usage. In particular embodiments, the data associated with the one or more applications may comprise real-time network traffic generated by the one or more applications. In particular embodiments, the data associated with the one or more applications may comprise identification information for each of the one or more application and indicators of whether each of the one or more applications is active. The first edge device may send the collected network data to one or more second edge devices through the wireless peer-to-peer network. The first edge device may receive network data associated with the one or more second edge devices through the wireless peer-to-peer network from the one or more second edge devices. The first edge device may run an optimization algorithm using the data collected by the first edge device and the data received from the one or more second edge devices as input to select a first access point among the plurality of access points to connect. An objective of the optimization algorithm may be maximizing overall network connectivity. In particular embodiments, the optimization algorithm may be a machine-learning algorithm. The first edge device may send a connection establishment request to the first access point. The first edge device may establish a connectivity with the first access point upon receiving a message indicating an acceptance of the request from the first access point. The first edge device may collect second network data associated with the first edge device at a later time. The first edge device may receive second network data associated with the one or more second edge devices from the one or more second edge devices through the wireless peer-to-peer network. The first edge device may run the optimization algorithm using the data collected by the first edge device and the data received from the one or more second edge devices as input to select a second access point that is different from the first access point among the plurality of access points to connect. The first edge device may send a connection establishment request to the second access point to switch from the first access point to the second access point.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Mobile Client System Overview

Figure 1:
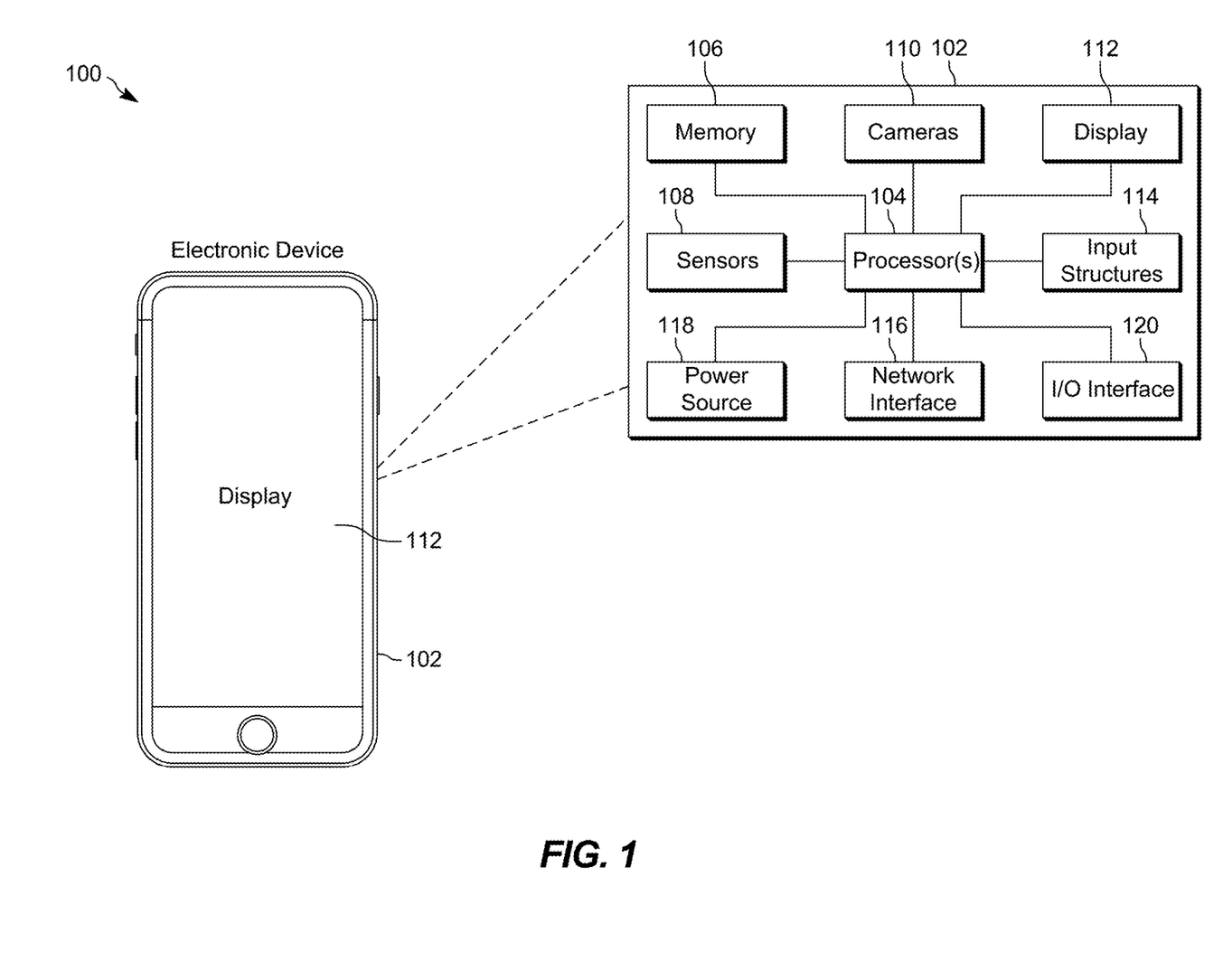
FIG. 1 illustrates an example electronic device.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Optimizing Wireless Network Accesses with Peer-to-Peer Networks

Figure 2:
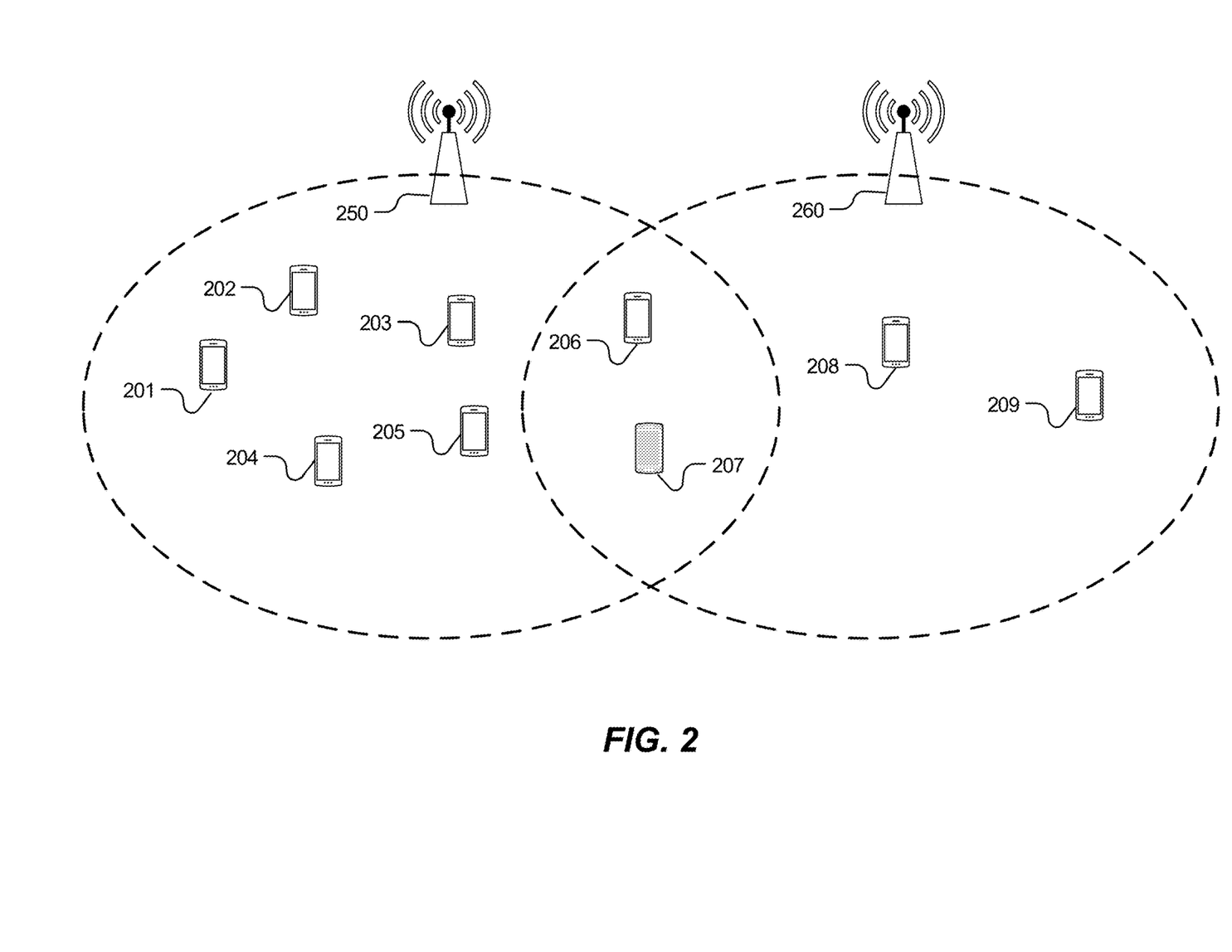
FIG. 2 illustrates an example scenario for accessing a wireless infrastructure network with a plurality of access points.

FIG. 2 illustrates an example scenario for accessing a wireless infrastructure network with a plurality of access points. In particular embodiments, an edge device may determine an access point to connect among the plurality of access points of the wireless infrastructure network based on network data associated with the edge device and network data associated with other edge devices received through a wireless peer-to-peer network. The number of devices using WLAN has been increasing drastically over the last several years with around 22.2 billion WLAN connected devices in 2021. WLAN access point is a popular method of connecting a device with the internet. Access point (also referred as AP) is a networking hardware device that helps in connecting wireless capable edge devices with wired networks through a wireless standard, such as Institute of Electrical and Electronics Engineers (IEEE) 802.11 family. Network congestion may be caused in a scenario when a number of devices connected to an access point is greater than a number that the access point can handle or when an amount of total traffic exceeds a capacity of the access point. The network congestion results in packet losses and reduced quality. The network congestion may happen in places such as a Grocery store where people at the billing/checkout is concentrated whereas few people exist in the other areas such as aisles. The network congestion may lead to drops in connections, which results in poor Quality of Experience (QoE). Offices and warehouses are among other places where a similar issue can occur.

At times, some client devices may be connected to an access point with a significantly low Received Signal Strength Indicator (RSSI). In certain cases, the client devices may not be able to communicate with the connected access point at all due to poor signal quality. Those client devices may cause performance degradation for other devices. The access points may use some strategies to mitigate such issues, such as encouraging devices to connect to the best available access point, discouraging devices to connect to low data rates, or de-authenticating devices that cannot be served. The edge devices may need a smart solution that can be implemented on the edge devices. The edge devices with such solution may enable the strategies in efficient manners.

Previous approaches to resolve the situations already exist including predicting the access point selection based on device characteristics such as device location and direction of movement. This approach may experience low accuracy in an indoor environment due to inaccurate indoor Global Positioning System (GPS). Another disadvantage associated with the previous approaches may be that the approaches may lead to a problem of local optima because each device is making a decision based on its own characteristics. With the methods disclosed herein, an edge device may consider network usage of other devices as well. Thus, the solution may lead to a globally optimum solution. No previous attempt exists to use a peer-to-peer network to collectively optimize the network usage by selecting the best access point. This approach may optimize the quality of experience by switching an edge device to another access point automatically when the edge device is experiencing a congestion with the current access point or the edge device is closer to the another access point. Switching of the edge device may lead to better QoE for the other edge devices in the network. The switch-over decision may be made based on data distributed through a peer-to-peer network of edge devices. Each edge device participating in the peer-to-peer network may run an optimization algorithm to determine whether the edge device needs to switch the access point. By avoiding the use of a central server, the approach may be able to avoid a single point of failure.

Certain technical challenges exist for optimizing the wireless network connectivity of the edge devices to the access points of a wireless infrastructure network. One technical challenge may include avoiding local optima that may occur when each device makes its own connectivity decision based on its own characteristics. The solution presented by the embodiments disclosed herein to address this challenge may be sharing collected network data with other edge devices through a peer-to-peer network. Each edge device may make a decision based on the shared network data. Another technical challenge may include avoiding a single point of failure when a server makes a decision for edge devices based on the collected network data from the edge devices. This approach may not work for an edge device that is not connected to the infrastructure network yet. The solution presented by the embodiments disclosed herein to address this challenge may be performing decision-making algorithm on each of a plurality of edge devices that share their network data through a wireless peer-to-peer network.

Certain embodiments disclosed herein may provide one or more technical advantages. A technical advantage of the embodiments may include that an edge device that is not connected to the wireless infrastructure network may be able to determine an optimal access point to connect based on network data collected from other edge devices through a wireless peer-to-peer network. Another technical advantage of the embodiments may include that a decision made by each edge device may be or close to a global optimum because the edge devices make their own decisions based on network data shared through the wireless peer-to-peer network. Certain embodiments disclosed herein may provide none, some, or all of the above technical advantages. One or more other technical advantages may be readily apparent to one skilled in the art in view of the figures, descriptions, and claims of the present disclosure.

In particular embodiments, a wireless infrastructure network may comprise a plurality of access points. A first edge device may select one of the plurality of access points to connect based on RSSIs for signals received from one or more of the plurality of access points. The first edge device may send a connection establishment request to the selected access point. The first edge device may determine that the request was unsuccessful either upon an expiration of a response waiting timer or upon receiving a message indicating a rejection to the request from the one of the plurality of access points. As an example and not by way of limitation, illustrated in FIG. 2, a first edge device 207 may attempt to establish a connectivity with a WLAN comprising a plurality of access points including a first access point 250 and a second access point 260. Though FIG. 2 illustrates only two access points 250 and 260, the WLAN may comprise more access points. The first access point 250 may be providing network connectivity to a plurality of edge devices including edge devices 201, 202, 203, 204, 205, and 206. While FIG. 2 illustrates only six active edge devices connected to the first access point 250, the first access point 250 may be connected to a greater number of edge devices. The second access point 260 may be connected to a lower number of edge devices including 208 and 209. The first edge device 207 may receive signals from the access points in the WLAN including the first access point 250 and the second access point 260. In particular embodiments, the first edge device 207 may decide to connect to the first access point 250 based on RSSIs of the received signals. The first edge device 207 may send a connection establishment request to the first access point 250. In particular embodiments, the connection establishment request may comprise an authentication information including a password for the WLAN. The first edge device 207 may determine that the connection establishment request is not successful based on a response message comprising an indication of refusing the connection establishment request from the first access point 250. In particular embodiments, either the connection establishment request or a response message from the first access point 250 may be lost due to congestions or poor signal qualities. The first edge device 207 may determine that the connection establishment request is not successful upon an expiration of a response waiting timer. The first edge device 207 may initiate the response waiting timer when the first edge device 207 sends the connection establishment request to the first access point 250. Upon the expiration of the response waiting timer, the first edge device 207 may determine that either the connection establishment request has not properly reached the first access point 250 or the connection establishment request was not accepted by the first access point 250. Although this disclosure describes failing to establish a connection to an access point in a particular manner, this disclosure contemplates failing to establish a connection to an access point in any suitable manner.

In particular embodiments, the first edge device may join a wireless peer-to-peer network while the first edge device is not connected to an access point of the wireless infrastructure network. In particular embodiments, the wireless peer-to-peer network may use Gossip protocol as a communication protocol. The wireless peer-to-peer network may use Bluetooth or Wi-Fi Direct for a communication medium. As an example and not by way of limitation, continuing with a prior example, the first edge device 207 may detect an existing wireless peer-to-peer network by listening to Bluetooth signals. The first edge device 207 may determine to join the peer-to-peer network. The peer-to-peer network uses Gossip protocol. The first edge device 207 may join the peer-to-peer network in accordance with Gossip protocol. As another example and not by way of limitation, continuing with a prior example, the first edge device 207 may detect a wireless peer-to-peer network based on Wi-Fi Direct signals. The first edge device 207 may determine to join the peer-to-peer network. The first edge device 207 may join the peer-to-peer network in accordance with Gossip protocol over the Wi-Fi Direct medium. Although this disclosure describes joining a wireless peer-to-peer network in a particular manner, this disclosure contemplates joining a wireless peer-to-peer network in any suitable manner.

Figure 3:
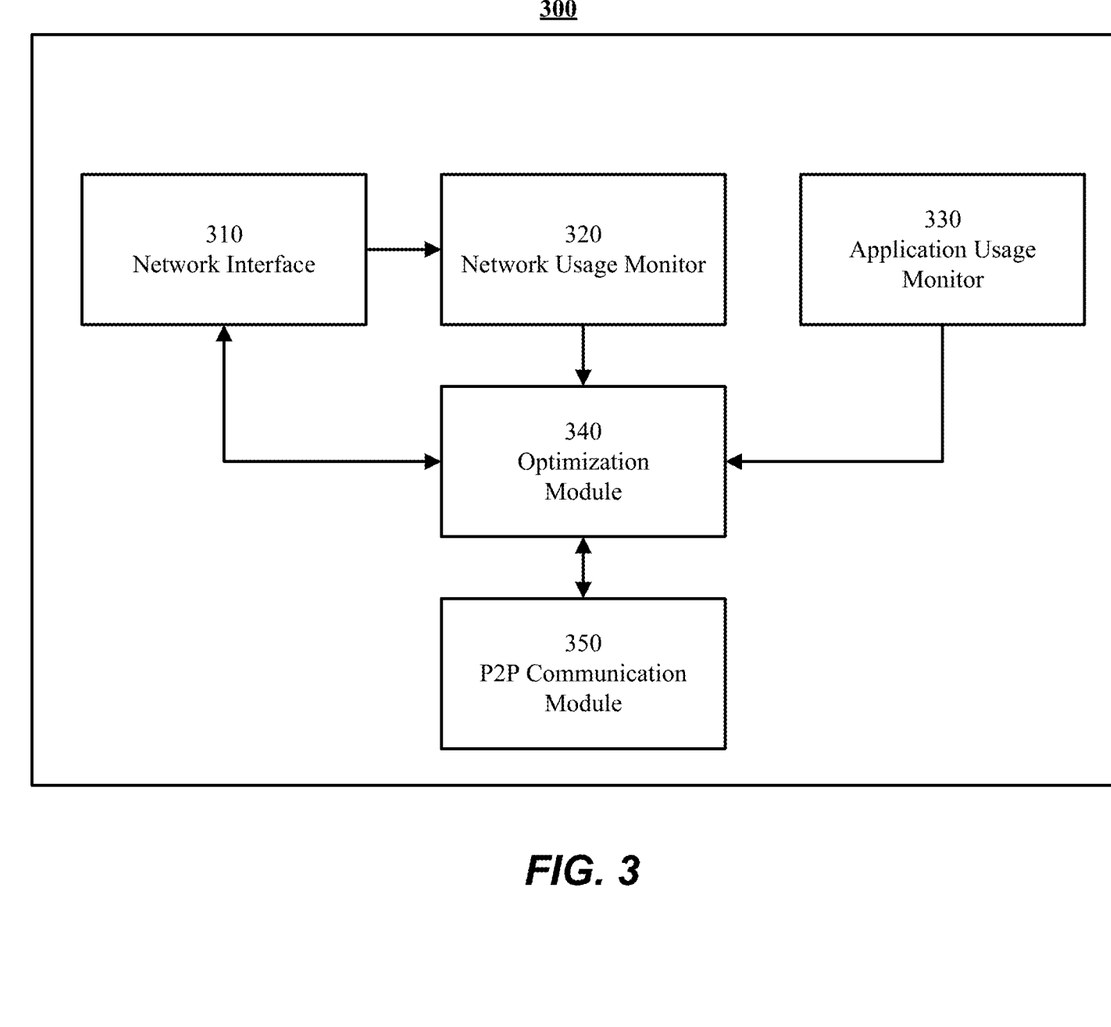
FIG. 3 illustrates an example logical architecture of an edge device for determining an access point to connect.

In particular embodiments, the first edge device may collect network data associated with the first edge device. The network data associated with an edge device may comprise data associated with a wireless network interface of the edge device and data associated with one or more applications running on the edge device. The network data associated with the wireless network interface of the edge device may comprise an identification information for an access point that the edge device is currently connected to, RSSIs for signals received from one or more of the plurality of access points, or real-time network usage. In particular embodiments, the data associated with the one or more applications may comprise real-time network traffic generated by the one or more applications. In particular embodiments, the data associated with the one or more applications may comprise indicators of whether each of the one or more applications is active. FIG. 3 illustrates an example logical architecture of an edge device for determining an access point to connect. As an example and not by way of limitation, continuing with a prior example, an optimization module 340 of the first edge device 207 may collect data associated with a wireless network interface 310 of the first edge device 207 through a network usage monitor module 320 of the first edge device 207. In particular embodiments, the optimization module 340 may collect at least a part of the data associated with the wireless network interface 310 by communicating with the wireless network interface 310 directly. The data associated with the wireless network interface 310 may comprise an identification information for an access point the first edge device 207 is currently connected to, RSSIs for signals received from one or more of the plurality of access points in the WLAN, real-time network usage measured at the wireless network interface 310, or any suitable data associated with the wireless network interface 310. The optimization module 340 may collect the data associated with the wireless network interface 310 at a regular interval. Although this disclosure describes collecting data associated with a wireless network interface of an edge device in a particular manner, this disclosure contemplates collecting data associated with a wireless network interface of an edge device in any suitable manner.

In particular embodiments, the data associated with the one or more applications may comprise real-time network traffic generated by the one or more applications. In particular embodiments, the data associated with the one or more applications may comprise indicators of whether each of the one or more applications is active. As an example and not by way of limitation, continuing with a prior example, the optimization module 340 of the first edge device 207 may collect data associated with one or more applications through an application usage monitor module 330. In particular embodiments, the data associated with one or more applications may comprise real-time network usage associated with pre-determined one or more applications. In particular embodiments, the data associated with one or more applications may comprise real-time network usage associated with all active applications running on the first edge device 207. As another example and not by way of limitation, the application usage monitor module 330 may monitor which application is currently active. In particular embodiments, the application usage monitor module 330 may provide a list of actively running applications to the optimization module 340. In particular embodiments, the application usage monitor module 330 may provide a list of indications indicating whether each of a list of pre-determined applications is actively running. Although this disclosure describes collecting data associated with one or more applications in a particular manner, this disclosure contemplates collecting data associated with one or more applications in any suitable manner.

In particular embodiments, the first edge device may send the collected network data to one or more second edge devices through the wireless peer-to-peer network. As an example and not by way of limitation, continuing with a prior example, the first edge device 207 may send the collected network data associated with the first edge device 207 to one or more second edge devices 201, 202, 203, 204, 205, 206, 208, or 209 through the wireless peer-to-peer network. The p2p communications may be done by a p2p communication module 350 in the first edge device 207 using Gossip protocol. In particular embodiments, the p2p communication module 350 may use any suitable p2p communication protocol. The optimization module 340 may compile the collected latest network data associated with the first edge device 207 and send the compiled network data to the p2p communication module 350 at a regular interval. Each compiled network data may be associated with a unique timestamp. Upon receiving the compiled network data from the optimization module 340, the p2p communication module 350 may send the compiled network data to the second edge devices 201, 202, 203, 204, 205, 206, 208, or 209 in the wireless peer-to-peer network using Bluetooth or WiFi Direct medium. In particular embodiments, the p2p communication module 350 may use any other suitable communication medium for the peer-to-peer communications. As the second edge devices relay the network data from the first edge device, the second edge devices 201, 202, 203, 204, 205, 206, 208, or 209 in the wireless peer-to-peer network may receive the network data from the first edge device 207 even when a second edge device is not within a communication range of the first edge device 207. When a second edge device 201, 202, 203, 204, 205, 206, 208, or 209 receives a network data more than one time, the second edge device 201, 202, 203, 204, 205, 206, 208, or 209 may filter out the duplicate network data based on the unique timestamp associated with the network data. The second edge devices 201, 202, 203, 204, 205, 206, 208, or 209 may also be able to determine an up-to-date network data associated with the first edge device 207 based on the unique timestamp associated with the network data. Although this disclosure describes sending network data associated with an edge device through a wireless peer-to-peer network in a particular manner, this disclosure contemplates sending network data associated with an edge device through a wireless peer-to-peer network in any suitable manner.

In particular embodiments, the first edge device may receive network data associated with the one or more second edge devices through the wireless peer-to-peer network from the one or more second edge devices. As an example and not by way of limitation, continuing with a prior example, the first edge device 207 may receive network data associated with one or more second edge devices 201, 202, 203, 204, 205, 206, 208, or 209 through the wireless peer-to-peer network. On receiving a chunk of network data, the p2p communication module 350 may filter out any outdated or duplicated network data based on the unique timestamp associated with the network data. The p2p communication module 350 may forward the up-to-date network data from each of the one or more second edge devices 201, 202, 203, 204, 205, 206, 208, or 209 to the optimization module 340. When no new network data from a particular second edge device has been received for a pre-determined period of time, the first edge device 207 may remove the particular second edge device from a list of wireless peer-to-peer network participants. When the first edge device 207 receives a new network data from an unknown second edge device, the first edge device 207 may add the second edge device to the list of wireless peer-to-peer network participants. Although this disclosure describes receiving network data associated with second edge devices through a wireless peer-to-peer network in a particular manner, this disclosure contemplates receiving network data associated with second edge devices through a wireless peer-to-peer network in any suitable manner.

Figure 4:
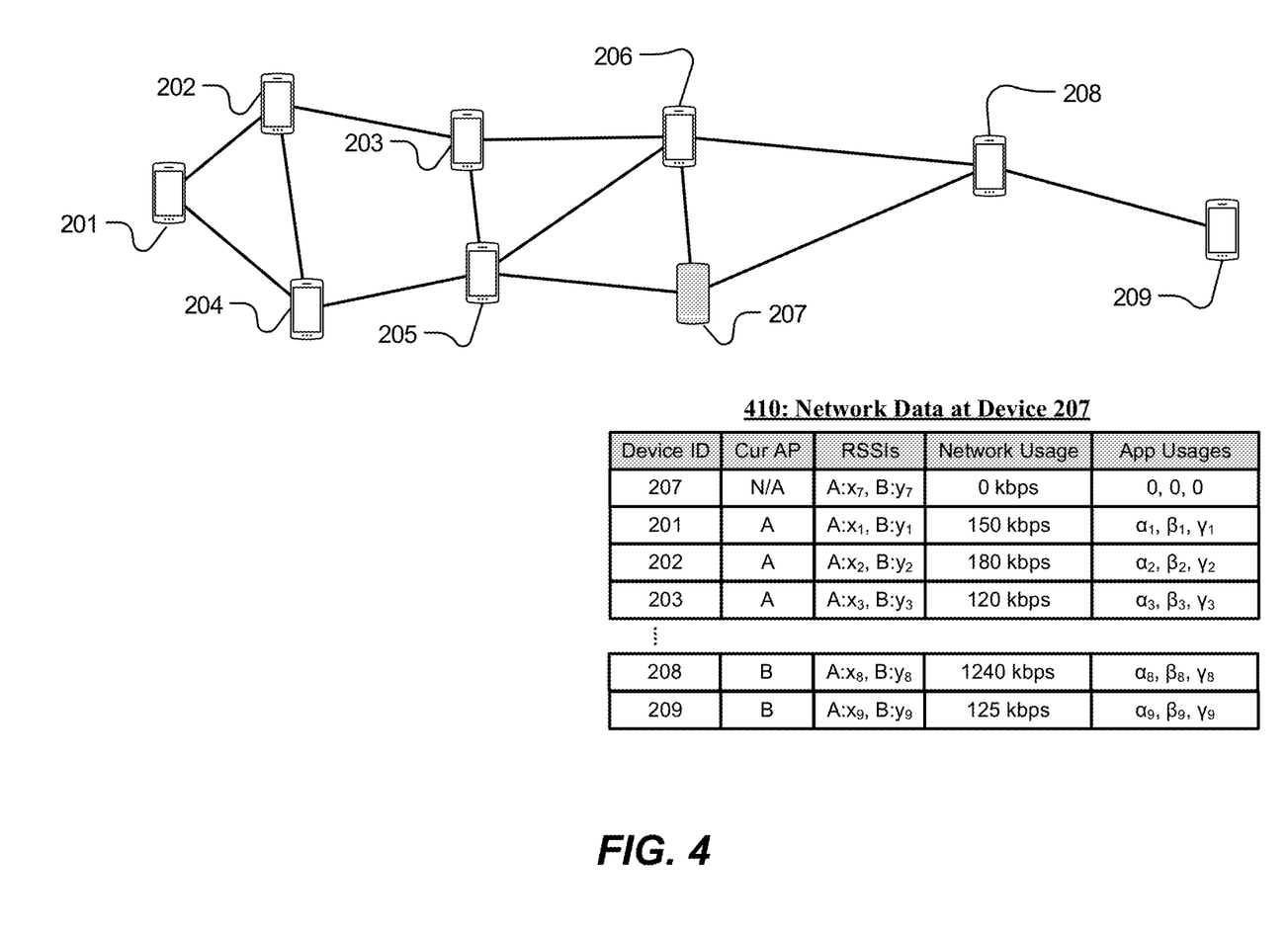
FIG. 4 illustrates an example wireless peer-to-peer network and network data shared through the wireless peer-to-peer network.

FIG. 4 illustrates an example wireless peer-to-peer network and network data shared through the wireless peer-to-peer network. As an example and not by way of limitation, continuing with a prior example, the first edge device 207 may have records of network data associated with the first edge device 207 itself and one or more of the second edge devices 201, 202, 203, 204, 205, 206, 208, or 209 after collecting the network data associated with the first edge device 207 and receiving the network data associated with one or more of the second edge devices 201, 202, 203, 204, 205, 206, 208, or 209 through the wireless peer-to-peer network. Each of the records may comprise an identification information for an edge device, an identification information for an access point that the edge device is currently connected to, RSSIs for signals the edge device receives from one or more of the plurality of access points in the WLAN, real-time network usage measured at the wireless network interface 310, real-time network usage associated with a list of pre-determined applications. Though FIG. 4 illustrates RSSIs from access points A and B in a table 410 of network data at the edge device 207, RSSIs from any reachable access points may be collected and shared among the edge devices, $\alpha$, $\beta$, and $\gamma$ respectively represent real-time network usage for pre-determined first, second, and third applications. In particular embodiments, data associated with one or more applications may comprise a list of real-time network usage for any actively running application on the edge device. In particular embodiments, data associated with one or more applications may comprise a list of indications indicating whether pre-determined one or more applications are currently actively running. Although this disclosure describes a particular network data collected by a first edge device and received from one or more second edge devices through a wireless peer-to-peer network, this disclosure contemplates any suitable network data collected by a first edge device and received from one or more second edge devices through a wireless peer-to-peer network.

In particular embodiments, the first edge device may run an optimization algorithm using the data collected by the first edge device and the data received from the one or more second edge devices as input to select a first access point among the plurality of access points to connect. An objective of the optimization algorithm may be maximizing overall network connectivity. In particular embodiments, the optimization algorithm may be a machine-learning algorithm.

As an example and not by way of limitation, continuing with a prior example, the optimization module 340 of the first edge device 207 may run an algorithm to optimize a fitness function using the network data 410 available at the edge device 207. An example optimization of a fitness function may be minimizing a fitness function as follow:

$$\min f(x) = \sum_{i=1}^{n} \frac{L_i \times C_i}{T_i} \quad (1)$$

Where C represents a latency, L represents packet loss ratio, and T represents throughput at each edge device i. The optimization module 340 may try to minimize the fitness function through successive iterations. The fitness function may be designed as a composite measure to allow the algorithm to minimize the overall latency as well as packet loss ratio at each edge devices while maximizing the throughput across all the edge devices that are participating the wireless peer-to-peer network. As another example and not by way of limitation, the optimization module 340 may run a machine-learning algorithm with the network data 410. The machine-learning algorithm may be trained to minimize the overall latency and packet loss ratio at each edge devices while maximizing the throughput across all the edge devices that are participating the wireless peer-to-peer network. Although this disclosure describes running an optimization algorithm in a particular manner, this disclosure contemplates running an optimization algorithm in any suitable manner.

In particular embodiments, the first edge device may determine to connect to a second access point based on a result of the optimization algorithm. The first edge device may send a connection establishment request to the second access point. The first edge device may establish a connectivity with the second access point upon receiving a message indicating an acceptance of the request from the second access point. As an example and not by way of limitation, continuing with a prior example, the optimization module 340 of the first edge device 207 may determine that connecting to the second access point 260 may result in an optimal state for the edge devices participating in the wireless peer-to-peer network based on a result of the optimization algorithm. The optimization module 340 may instruct the wireless network interface 310 to connect to the second access point 260. A module associated with the wireless network interface 310 may send a connection establishment request to the second access point 260. Upon receiving a response message indicating an acceptance of the request from the second access point 260, the wireless network interface 310 may report to the optimization module 340 that the first edge device 207 is currently connected to the second access point 260. Although this disclosure describes establishing a connection with an access point among a plurality of access points based on a result of an optimization algorithm with network data gathered through a wireless peer-to-peer network in a particular manner, this disclosure contemplates establishing a connection with an access point among a plurality of access points based on a result of an optimization algorithm with network data gathered through a wireless peer-to-peer network in any suitable manner.

Figure 5:
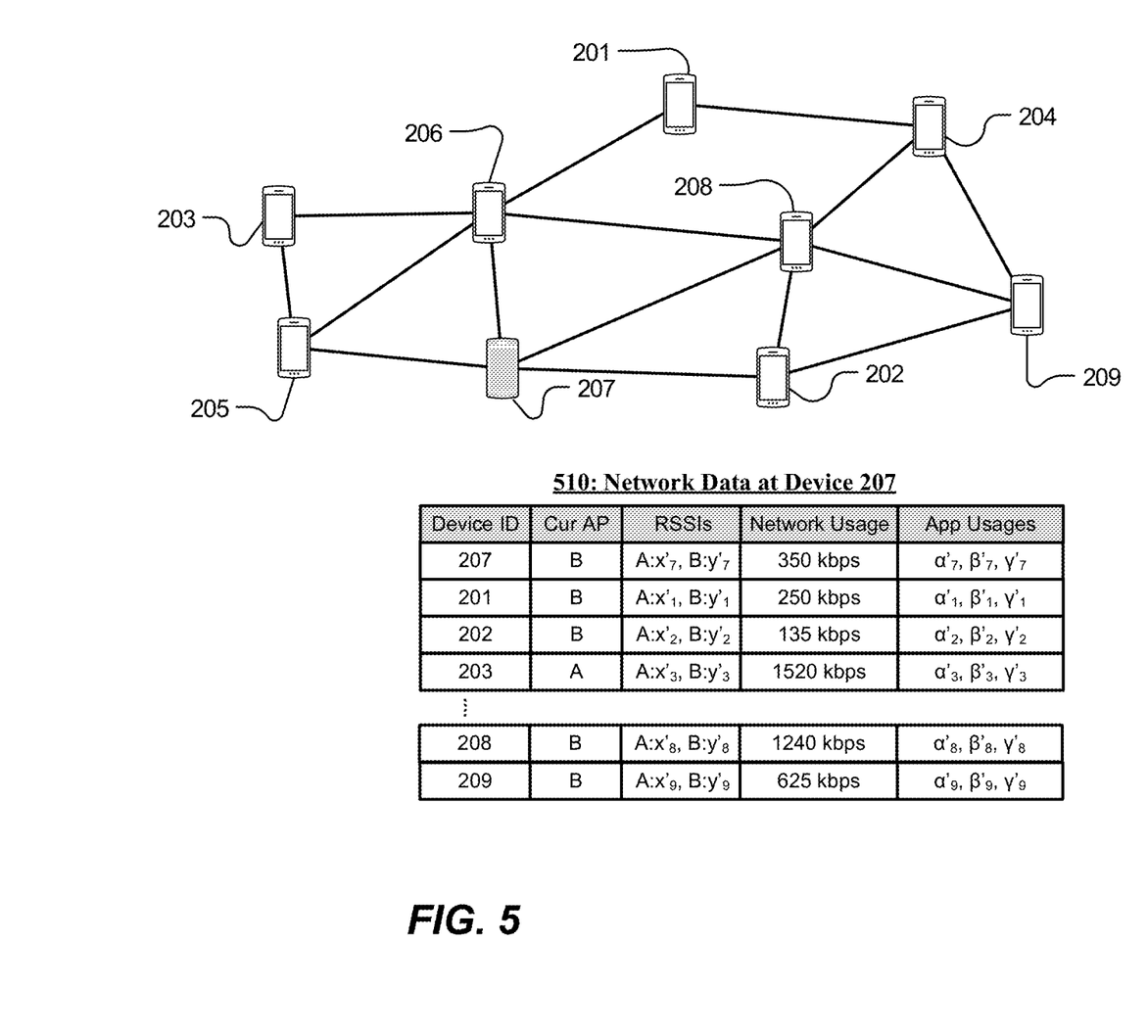
FIG. 5 illustrates an example wireless peer-to-peer network and network data shared through the wireless peer-to-peer network after the edge devices moved around.

FIG. 5 illustrates an example wireless peer-to-peer network and network data shared through the wireless peer-to-peer network after the edge devices moved around. As an example and not by way of limitation, continuing with a prior example, the edge devices moved around over a period of time. In the example illustrated in FIG. 5, second edge devices 201, 202, and 204 moved from a coverage of the first access point 250 to a coverage of the second access point 260. Thus, the second edge devices 201, 202, and 204 switched to the second access points 260.

In particular embodiments, the first edge device may collect second network data associated with the first edge device at a later time. The first edge device may receive second network data associated with the one or more second edge devices from the one or more second edge devices through the wireless peer-to-peer network. As an example and not by way of limitation, continuing with a prior example illustrated in FIG. 5, the first edge device 207 may collect network data associated with the first edge device 207 through the network usage monitor 320 and the application usage monitor 330. The first edge device 207 may send the collected network data to the second edge devices 201, 202, 203, 204, 205, 206, 208, or 209 in the wireless peer-to-peer network. The first edge device 207 may receive up-to-date network data associated with one or more second edge devices 201, 202, 203, 204, 205, 206, 208, or 209 through the wireless peer-to-peer network. The first edge device 207 may compile updated network data 510 based on the collected network data within the first edge device 207 and the received network data through the wireless peer-to-peer network. Although this disclosure describes gathering and compiling an updated network data in a particular manner, this disclosure contemplates gathering and compiling an updated network data in any suitable manner.

In particular embodiments, the first edge device may run the optimization algorithm using the data collected by the first edge device and the data received from the one or more second edge devices as input to select a first access point that is different from the second access point among the plurality of access points to connect. The first edge device may send a connection establishment request to the first access point to switch from the second access point to the first access point. As an example and not by way of limitation, continuing with a prior example, the first edge device 207 may be connected to the second access point 260. The optimization module 340 of the first edge device 207 may run the algorithm to optimize a fitness function again using the network data 510 available at the edge device 207. In particular embodiments, the optimization module 340 of the first edge device 207 may run the machine-learning algorithm that is trained to minimize the overall latency and packet loss ratio at each edge devices while maximizing the throughput across all the edge devices that are participating the wireless peer-to-peer network. The optimization module 340 of the first edge device 207 may determine that switching to the first access point 250 from the second access point 260 may result in an optimal state for the edge devices participating in the wireless peer-to-peer network based on a result of the optimization algorithm. The optimization module 340 may instruct the wireless network interface 410 to connect to the first access point 250. A module associated with the wireless network interface 410 may send a connection establishment request to the first access point 250. Upon receiving a response message indicating an acceptance of the request from the first access point 250, the wireless network interface 410 may report to the optimization module 340 that the first edge device 207 is currently connected to the first access point 250. Although this disclosure describes switching to another access point based on a result of an optimization algorithm that is performed with network data gathered through a wireless peer-to-peer network in a particular manner, this disclosure contemplates switching to another access point based on a result of an optimization algorithm that is performed with network data gathered through a wireless peer-to-peer network in any suitable manner.

Figure 6:
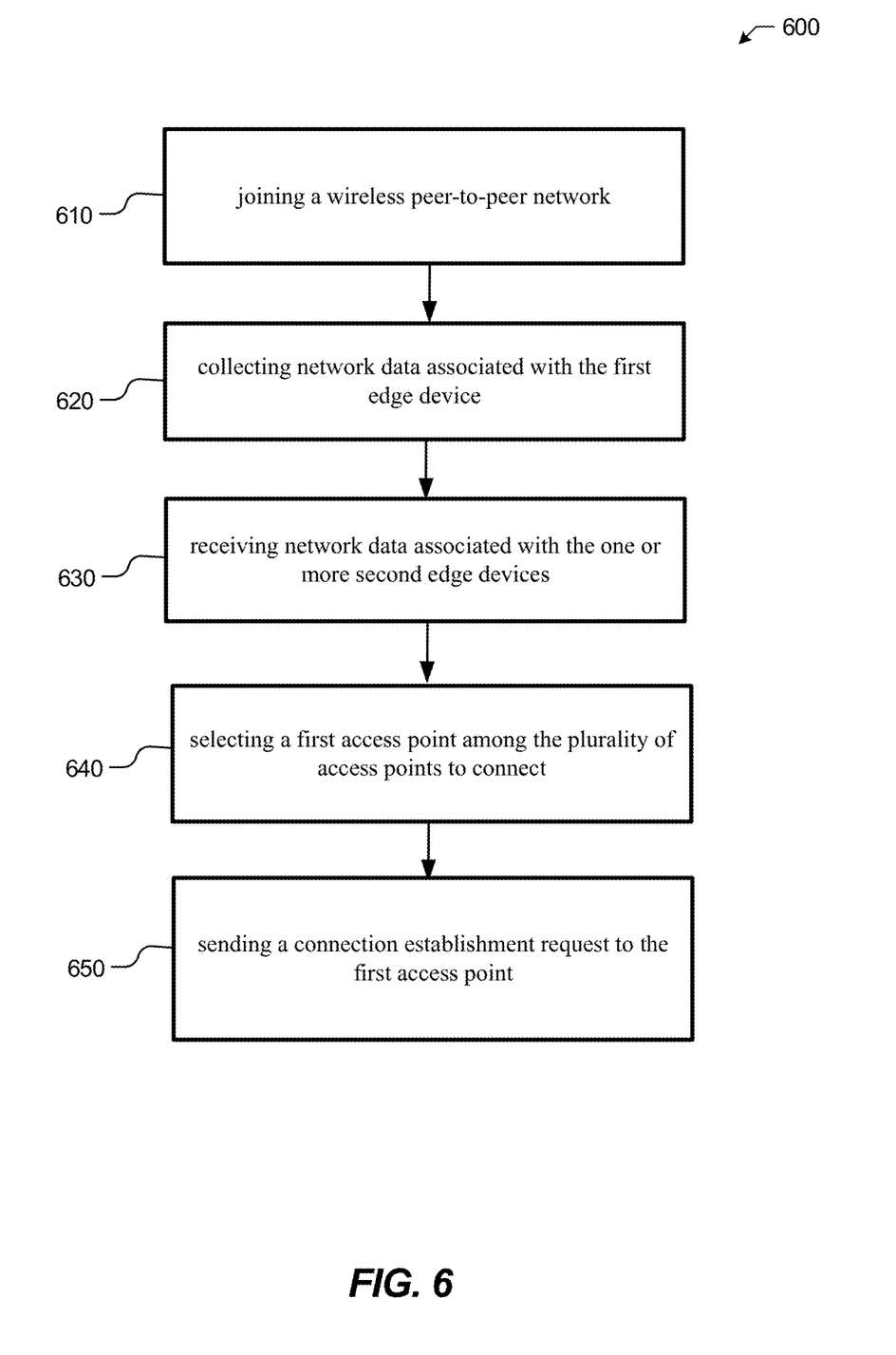
FIG. 6 illustrates an example method for determining an access point to connect among a plurality of access points of a wireless infrastructure network based on network data associated with edge devices that are participating in a wireless peer-to-peer network.

FIG. 6 illustrates is a flow diagram of a method 600 for determining an access point to connect among a plurality of access points of a wireless infrastructure network based on network data associated with edge devices that are participating in a wireless peer-to-peer network, in accordance with the presently disclosed embodiments. The method 600 may be performed utilizing one or more processing devices (e.g., a first edge device 207) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 600 may begin at step 610 with the one or more processing devices (e.g., the first edge device 207), where the first edge device 207 may join a wireless peer-to-peer network. The first edge device may not be connected to an access point of a wireless infrastructure network. The wireless infrastructure network may comprise a plurality of access points. The method 600 may then continue at step 620 with the one or more processing devices (e.g., the first edge device 207), where the first edge device 207 may collect network data associated with the first edge device. At step 630, the first edge device 207 may receive network data associated with one or more second edge devices from the one or more second edge devices through the wireless peer-to-peer network. At step 640, the first edge device 207 may select a first access point among the plurality of access points to connect based on the network data collected by the first edge device and the network data received from the one or more second edge devices. Selecting the first access point among the plurality of access points may comprise running an optimization algorithm using the data collected by the first edge device and the data received from the one or more second edge devices as input. An objective of the optimization algorithm may be maximizing overall network connectivity. At step 650, the first edge device 207 may send a connection establishment request to the first access point. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining an access point to connect among a plurality of access points of a wireless infrastructure network based on network data associated with edge devices that are participating in a wireless peer-to-peer network including the particular steps of the method of FIG. 6, this disclosure contemplates any suitable method for determining an access point to connect among a plurality of access points of a wireless infrastructure network based on network data associated with edge devices that are participating in a wireless peer-to-peer network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
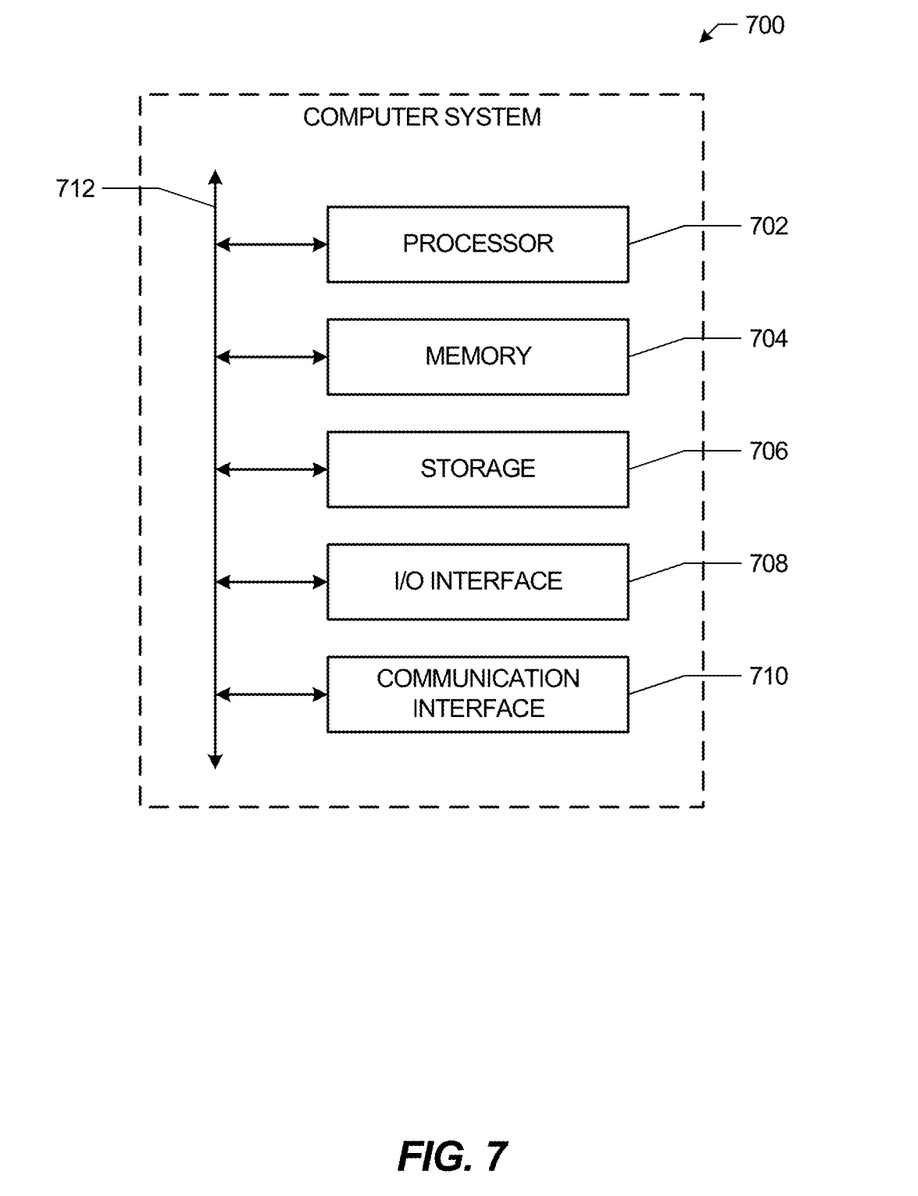
FIG. 7 illustrates an example computer system.

FIG. 7 illustrates an example computer system 700 that may be utilized to perform determining an access point to connect among a plurality of access points of a wireless infrastructure network based on network data associated with edge devices that are participating in a wireless peer-to-peer network, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memory devices 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first edge device:
    joining a wireless peer-to-peer network, wherein the first edge device is not connected to an access point of a wireless infrastructure network, and wherein the wireless infrastructure network comprises a plurality of access points;
    collecting network data associated with the first edge device;
    receiving, from one or more second edge devices, through the wireless peer-to-peer network, network data associated with the one or more second edge devices;
    selecting a first access point among the plurality of access points to connect based on the network data collected by the first edge device and the network data received from the one or more second edge devices; and
    sending a connection establishment request to the first access point.

2. The method of claim 1, further comprising:
    sending, prior to joining the wireless peer-to-peer network, a connection establishment request to one of the plurality of access points.

3. The method of claim 2, wherein the first edge device selects the one of the plurality of access points based on Received Signal Strength Indicators (RSSIs) for signals received from one or more of the plurality of access points.

4. The method of claim 2, further comprising:
    receiving, from the one of the plurality of access points, a message indicating a rejection to the request.

5. The method of claim 2, further comprising:
    determining, upon an expiration of a response waiting timer, that the request was unsuccessful.

6. The method of claim 1, wherein the network data associated with an edge device comprises data associated with a wireless network interface of the edge device and data associated with one or more applications running on the edge device.

7. The method of claim 6, wherein the data associated with the wireless network interface of the edge device comprises an identification information for an access point that the edge device is currently connected to, RSSIs for signals received from one or more of the plurality of access points, or real-time network usage.

8. The method of claim 6, wherein the data associated with the one or more applications comprises real-time network traffic generated by the one or more applications.

9. The method of claim 6, wherein the data associated with the one or more applications comprises indicators of whether each of the one or more applications is active.

10. The method of claim 1, wherein selecting the first access point among the plurality of access points comprise running an optimization algorithm using the data collected by the first edge device and the data received from the one or more second edge devices as input, and wherein an objective of the optimization algorithm is maximizing overall network connectivity.

11. The method of claim 10, wherein the optimization algorithm is a machine-learning algorithm.

12. The method of claim 1, wherein the wireless peer-to-peer network uses Gossip protocol for a protocol.

13. The method of claim 1, wherein the wireless peer-to-peer network uses Bluetooth or Wi-Fi Direct for a communication medium.

14. The method of claim 1, further comprising:
collecting second network data associated with the first edge device;
receiving, from the one or more second edge devices, through the wireless peer-to-peer network, second network data associated with the one or more second edge devices;
selecting a second access point that is different from the first access point among the plurality of access points to connect based on the second network data associated with the first edge device, the second network data associated with one or more second edge devices; and
sending a connection establishment request to the second access point to switch from the first access point to the second access point.

15. A first edge device comprising:
one or more displays;
one or more wireless network interfaces;
one or more non-transitory computer-readable storage media including instructions; and
one or more processors coupled to the storage media, the one or more processors configured to execute the instructions to:
join a wireless peer-to-peer network, wherein the first edge device is not connected to an access point of a wireless infrastructure network, and wherein the wireless infrastructure network comprises a plurality of access points;
collect network data associated with the first edge device;
receive, from one or more second edge devices, through the wireless peer-to-peer network, network data associated with the one or more second edge devices;
select a first access point among the plurality of access points to connect based on the network data collected by the first edge device and the network data received from the one or more second edge devices; and
send a connection establishment request to the first access point.

16. The first edge device of claim 15, wherein the network data associated with an edge device comprises data associated with a wireless network interface of the edge device and data associated with one or more applications running on the edge device.

17. The first edge device of claim 16, wherein the data associated with the wireless network interface of the edge device comprises an identification information for an access point that the edge device is currently connected to, RSSIs for signals received from one or more of the plurality of access points, or real-time network usage.

18. The first edge device of claim 16, wherein the data associated with the one or more applications comprises real-time network traffic generated by the one or more applications.

19. The first edge device of claim 16, wherein the data associated with the one or more applications comprises indicators of whether each of the one or more applications is active.

20. A computer-readable non-transitory storage media comprising instructions executable by a processor of a first edge device to:
join a wireless peer-to-peer network, wherein the first edge device is not connected to an access point of a wireless infrastructure network, and wherein the wireless infrastructure network comprises a plurality of access points;
collect network data associated with the first edge device;
receive, from one or more second edge devices, through the wireless peer-to-peer network, network data associated with the one or more second edge devices;
select a first access point among the plurality of access points to connect based on the network data collected by the first edge device and the network data received from the one or more second edge devices; and
send a connection establishment request to the first access point.

* * * * *